Feb. 22, 1949. C. W. LANGE 2,462,649
COOLING ARRANGEMENT FOR DYNAMOELECTRIC MACHINES
Filed April 8, 1947
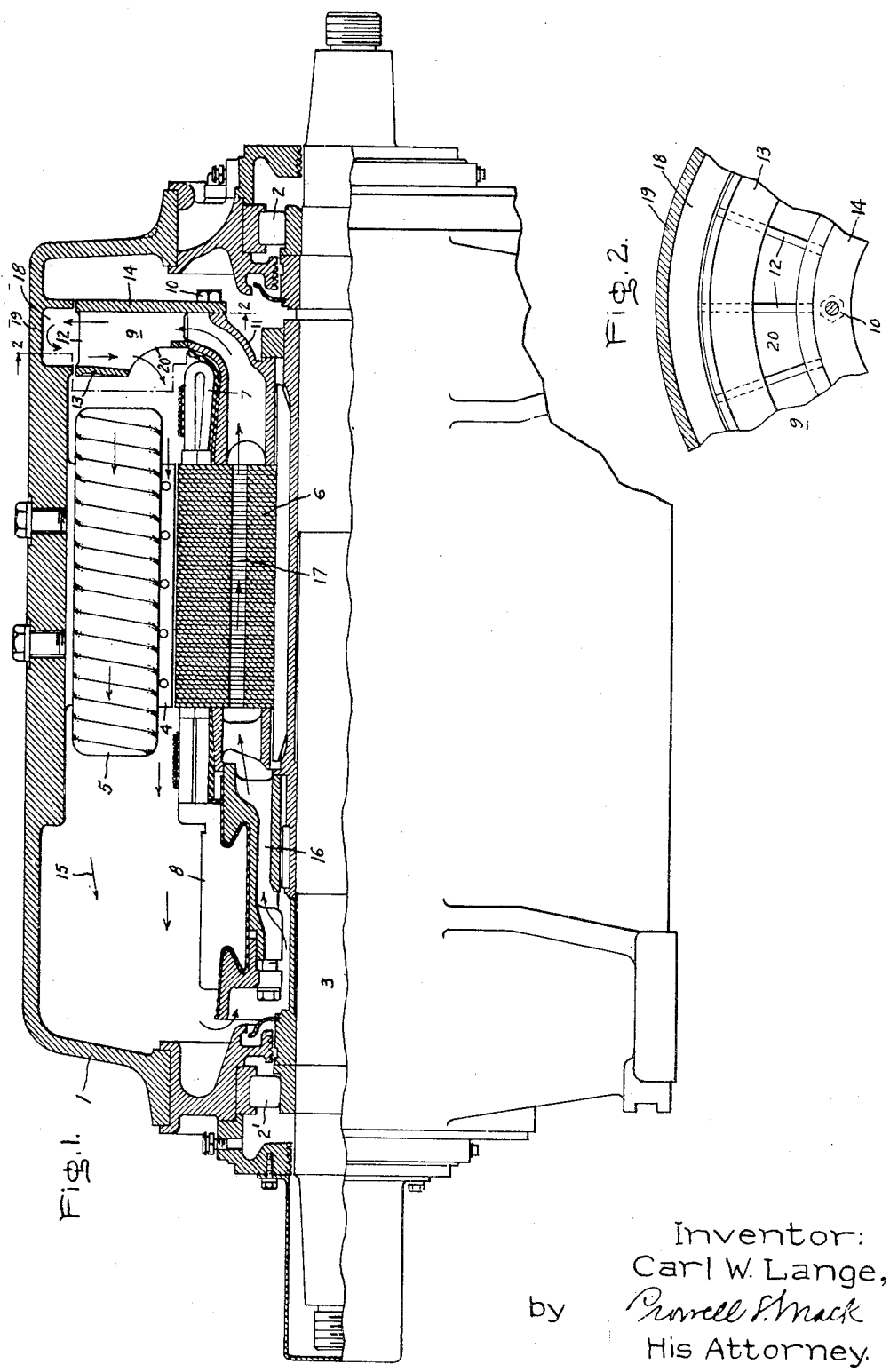
Inventor:
Carl W. Lange,
by Prowell P. Mack
His Attorney.

Patented Feb. 22, 1949

2,462,649

UNITED STATES PATENT OFFICE 2,462,649

COOLING ARRANGEMENT FOR DYNAMO-ELECTRIC MACHINES

Carl W. Lange, Erie, Pa., assignor to General Electric Company, a corporation of New York Application April 8, 1947, Serial No. 740,199

6 Claims. (Cl. 171—252)

My invention relates to an arrangement for cooling dynamoelectric machines, and more particularly to an internal ventilating and cooling arrangement for a totally enclosed type of dynamoelectric machine.

One of the prime objects of the designers of dynamoelectric machines has been to increase the electrical and mechanical power rating of the machines without corresponding increase in frame size and cost of construction. The increase in output rating of a motor or generator involves the provision of more efficient cooling and ventilating means if the overall size and weight are not to be increased. In the case of totally enclosed motors or generators which must operate under adverse conditions and where it is impracticable to provide auxiliary external cooling and ventilating apparatus, it is important that the machines be adequately cooled so that internal temperature rise will be kept within safe limits, while at the same time obtaining from the motor or generator, as the case may be, all available power output in the case of a generator, or maximum torque or horsepower rating in the case of a motor.

It is, therefore, an object of my invention to provide an improved cooling system for a dynamoelectric machine.

It is a further object of my invention to provide an improved totally enclosed dynamoelectric machine having an efficient internal cooling and ventilating system.

For a better understanding of my invention, reference may be had to the following description taken in connection with the accompanying drawing, and its scope will be pointed out in the appended claims.

In the drawing, I have shown my invention as applied to a mill or industrial-type motor of the totally enclosed type; however, it is not limited to such machines and may be equally well applied to other types of motors as well as to generators. Fig. 1 shows an elevational view, partially in cross section, of a motor embodying my invention, and Fig. 2 shows a portion of the fan construction as viewed along the line 2—2 of Fig. 1.

Referring to Fig. 1 of the drawing, I have shown an enclosing casing or frame 1 of a dynamoelectric machine which is provided with aligned bearings 2 and 2' in the end shields thereof, for rotatably supporting the armature shaft 3. Projecting inwardly from the casing 1 are the field magnet poles, of which one pole, 4, is shown together with the field exciting winding 5 mounted thereon. The shaft 3 of the dynamoelectric machine carries a laminated core structure 6 in which the slots carrying the armature winding 7 are disposed, and also supports the commutator 8 for conducting current to the armature windings 7. Since the conventional brushes, brush rigging and supports form no part of my invention, they have been omitted from the drawing in the interests of simplicity.

Mounted on the opposite end of the armature from the commutator 8 is an air circulating fan 9 which is secured by bolts 10 to the end ring 11 of the armature. The fan 9 is of the radial vane type having a plurality of equally spaced radially extending ribs or vanes 12 forming air passages between the inner side wall 13 and outer side wall 14 of the fan. Thus the central air inlets to the fan are in register with the armature air ducts 17 and air passages formed in the armature end ring 11.

As shown by the directional arrows 15, the cooling air flow through the motor passes underneath the commutator 8 through the ducts 16, thence through the air passages 17 extending longitudinally of the armature, and through connecting air passages in the armature end ring which communicate directly with the central inlet portion of the fan. By this arrangement, air is drawn under the commutator, through the armature laminations, into the inlet of the fan 9 and expelled outwardly through the radial passages in the fan itself. Aligned with the outer periphery of the fan is an annular circumferential chamber 18 which is coextensive with and, in effect, completely surrounds the outlets of the radial fan passages and, in addition, forms a thin wall section 19 in the main machine casing 1. By this construction, as the air is expelled outwardly from the radial passage of the fan, air compression is obtained in the annular chamber 18 with a consequent transfer of heat to the thin-walled heat dissipating portion 19 of the machine casing. It has been found that a large amount of the internal heat generated incident to the operation of the machine is thus dissipated in the compression chamber 18, in which, as previously mentioned, the air is compressed by its own velocity and mass due to the centrifugal action of the fan. When the compressed air in the chamber 18 attains a pressure sufficient to force the air back into the fan, it will be noted that the air flows along the inner edge of the fan, escaping from the secondary fan outlet 20 adjacent the inlet passages of the fan. In this connection I have found that the subsequent expansion of air as it escapes from the outlet 20 of the fan and passes around the field coils 5 and over the surface of the armature core and windings, as shown by the directional arrows 15, produces an additional desirable cooling effect.

Reference to Fig. 2 will give a clearer understanding of the construction of the ventilating fan in which the co-operation of the radial outlet passages of the fan with the annular compression chamber 18 is more clearly shown as well as the central secondary outlet passages 20 through which the compressed air escapes to be subsequently expanded, exerting its cooling effect on the field coils and armature surface.

The fan is preferably constructed of substantially greater width than usually the case in machines of this type, and it will be understood that the size and volume of the compression chamber 18 may be varied to suit the size of the fan, as well as the particular shape of the main casing 1 of the machine, the important feature of my invention residing in the utilization of a fan having a central as well as a peripheral air outlet and operating, as previously described, to cause compression of the air in a region where the heat can be abstracted from the machine, and also functioning to produce expansion of the air with resultant absorption of heat from the working parts such as the armature surface and field coils of the machine. It is, therefore, evident that in a totally enclosed machine of this type, the usual ventilation and cooling are obtained by air re-circulation in addition to the novel compression and expansion cooling cycle produced by my invention as previously described. I have found that in a motor, for example, a considerable increase in the long time enclosed H. P. and torque ratings, such as 5 hours, 8 hours, and continuous enclosed ratings, and also in the duty cycle or cyclic enclosed H. P. and torque ratings such as half time on—half time off, two thirds time on—one third time off, and so on, is achieved by the cooling system described, the increase becoming progressively greater as the length of the time rating or the time on for the load is increased, the increase in the 8 hour time ratings ranging as high as 70% over, and the increase in the two thirds time on ratings ranging as high as 25% over the corresponding ratings of larger and heavier enclosed motors having the same short time enclosed ratings, such as ¼ hour, ½ hour, 1 hour enclosed ratings, but with conventional forms of self-cooling.

While I have shown and described a particular embodiment of my invention, it will be obvious to those skilled in the art that changes and modifications may be made without departing from my invention in its broader aspects, and I, therefore, aim in the appended claims to cover such changes and modifications as fall within the true spirit and scope of my invention.

What I claim as new and desire to secure by Letters Patent of the United States is:

1. A dynamoelectric machine comprising, a totally enclosed stator frame, field exciting coils positioned within said frame, an armature mounted for rotation therein, an air circulating fan positioned at one end of said armature for rotation therewith, a plurality of radially extending air passages in said fan each having a centrally located air inlet and a peripherally located air outlet therein, a closed annular chamber formed in the internal surface of said frame coextensive with and communicating directly with said peripheral outlets of said fan, and means including a close fit between said closed annular chamber and said fan to provide a substantially closed circuit for ventilating medium from said fan to said annular chamber and back to said fan, a second air discharge port in said fan communicating with said radial passages and disposed inwardly towards the center of said fan and toward said armature, whereby compression of cooling medium and resultant heat dissipation may be obtained in said chamber and expansion of cooling medium and resultant cooling may be obtained at said second air discharge port.

2. A ventilating fan for a totally enclosed dynamoelectric machine comprising, an armature mounted for rotation in said machine, axial air ducts in said armature, said fan positioned at one end of said armature for rotation therewith and having a plurality of radially extending air passages therein communicating with said axial air ducts and adapted to draw air therefrom upon rotation of said armature, a discharge outlet for each of said fan radially extending air passages positioned at the periphery of said fan, a stationary chamber arranged around the periphery of said fan and adjacent said discharge outlet for forming a substantially closed circuit for ventilating air whereby air discharged at said discharge outlets will be reintroduced into said discharge passages of said fan, and a discharge outlet for each of said air passages disposed inwardly toward the center of said fan whereby air thus reintroduced to said fan will be finally discharged at points of lesser radius than the radius of points at said first-mentioned discharge outlets.

3. A ventilating fan for a totally enclosed dynamoelectric machine comprising, an armature mounted for rotation in said machine, axial air ducts in said armature, said fan positioned at one end of said armature for rotation therewith and having a plurality of radially extending air passages therein communicating at their inner ends with said axial air ducts whereby said fan is adapted to draw ventilating medium from said air ducts, a discharge outlet for each of said air passages positioned at the periphery of said fan, an annular air compression chamber disposed adjacent said discharge outlets of said fan and substantially enclosing said discharge outlets whereby said chamber is adapted to provide compression of ventilating medium when said fan is operating, and means including additional discharge outlets positioned inwardly of said fan and facing said armature for allowing escape of air compressed in said chamber and in said fan discharge passages by operation of said fan within said annular chamber.

4. A dynamo electric machine comprising a totally enclosed casing, field magnet poles and coils disposed inwardly of said casing, an armature supported by bearings in said casing for rotation therein, air circulating means mounted at one end of said armature, said air circulating means including a radially vaned fan having a centrally located air intake and peripheral air discharge, means adjacent said peripheral air discharge for redirecting ventilating medium back into said fan to cause compression of said medium, and second air discharge means for said fan positioned intermediately between said intake and said peripheral discharge for expelling said air toward the surface of said armature and around said field magnet coils.

5. A dynamoelectric machine comprising a totally enclosed casing, field magnet poles and coils disposed inwardly of said casing, an armature supported by bearings in said casing for rotation therein, air circulating means mounted at one end of said armature, said air circulating means including a radially vaned fan having a centrally located air intake and peripheral air discharge, an annular chamber formed in the inner surface of said casing and forming a dead end passage communicating with said peripheral air discharge of said fan, and second air discharge means for said fan positioned intermediately between said intake and said peripheral discharge for expelling said air toward the surface of said armature and around said field magnet coils.

6. A dynamoelectric machine having a totally enclosed frame and a rotating armature and fan therein, ventilating ducts in said armature communicating with the intake of said fan, and an annular chamber in said casing and adjacent an outlet of said fan whereby said chamber is adapted to compress ventilating medium by centrifugal action of said fan, said chamber having a thin-walled radiator portion adapted to abstract heat from air compressed therein, and said fan having an additional outlet positioned intermediate its intake and said outlet adjacent said chamber, said additional outlet being adapted to direct ventilating medium through said casing and over said armature.

CARL W. LANGE.

REFERENCES CITED

The following references are of record in the file of this patent:

UNITED STATES PATENTS

| Number | Name | Date |
|---|---|---|
| 1,222,465 | Priest | Apr. 10, 1917 |
| 1,551,295 | Fletcher | Aug. 25, 1925 |
| 1,672,680 | Freiburghouse | June 5, 1928 |
| 1,752,364 | Bollinger | Apr. 1, 1930 |

FOREIGN PATENTS

| Number | Country | Date |
|---|---|---|
| 383,674 | Great Britain | Nov. 24, 1932 |
| 167,542 | Great Britain | Aug. 4, 1921 |